United States Patent

[11] 3,627,014

| [72] | Inventors | Hideo Nishikawa Akashi; Akihiro Kawaguchi Akashi; Koichi Washimi, Iwaki all of Japan |
|---|---|---|
| [21] | Appl. No. | 12,072 |
| [22] | Filed | Feb. 17, 1970 |
| [45] | Patented | Dec. 14, 1971 |
| [73] | Assignees | Kureha Kagaku Kogyo Kabushiki Kaisha Tokyo-to, ; Mitsubishi Jyukogyo Kabushiki Kaisha Tokyo-to, Japan |
| [32] | Priority | Feb. 20, 1969 |
| [33] | | Japan |
| [31] | | 44/12444 |

[54] HEAT-EXCHANGER SYSTEM
4 Claims, 1 Drawing Fig.

[52] U.S. Cl. ............................................. 165/4, 165/97, 263/15
[51] Int. Cl. ............................................. F23f 15/02
[50] Field of Search ................................... 165/4, 97, 106, 104, 140; 263/15, 193

[56] References Cited
UNITED STATES PATENTS

| 1,062,122 | 5/1913 | Schroeber et al. | 165/4 |
| 1,485,770 | 3/1924 | De Mare | 165/4 |
| 1,062,122 | 5/1913 | Schroeder et al. | 165/4 |

*Primary Examiner*—Charles Sukalo
*Attorneys*—Robert E. Burns and Emmanuel J. Lobato ABSTRACT: Heat exchanger system comprises a plurality of heat exchangers, each being provided with heating means, and preheaters mutually paired and connected by connecting tubes having control valves. The preheaters are heated by exhaust gas generated in the heating means and sent from the heat exchangers, and the heated air in each preheater is fed back to the heating means by interchanging operations of the control valves from heat accumulation to heat release or vice versa in the heat exchangers.

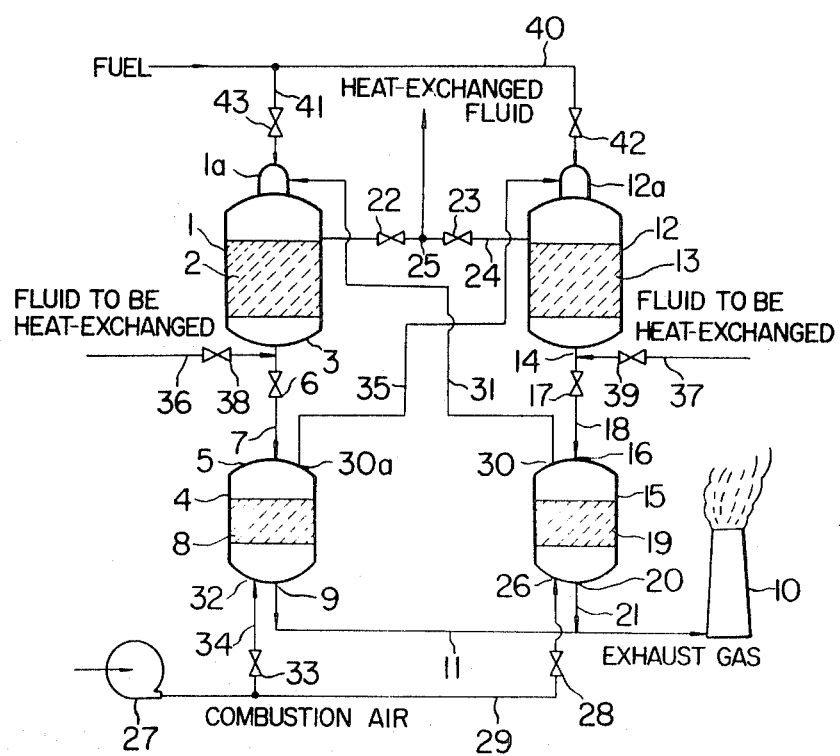

HEAT-EXCHANGER SYSTEM

BACKGROUND OF THE INVENTION

This invention relates to a heat exchanger system, and more particularly it is concerned with an improvement in arranging a plurality of heat exchangers, wherein the heat exchangers are mutually paired with air preheaters through connecting tubes, and combustion air is preheated by a heat accumulating medium in the respective preheaters which have been heated by exhaust gas produced at the time of fuel combustion in the heat exchangers, whereby uniform and effective heat exchanging operation can be achieved in a continuous manner.

In a regenerative heat exchanger, when a gas of super high temperature of more than 2,000° C. is to be obtained, air for combustion should inevitably be preheated. For this purpose, exhaust gas from a heating source has usually been used. In this case, however, the temperature of the exhaust gas after commencement of the heating keeps increasing with lapse of time, which is a peculiar phenomenon with the regenerative heat exchanger. Moreover, as the heating is repeated at a definite time interval by intermittent change-over operations, the temperature of the exhaust gas varies widely, and when the temperature variations with time are plotted on a graph, the curve assumes a remarkable saw tooth shape. Therefore, when the exhaust gas having such temperature variations is utilized for preheating of air in the conventional cylindrical furnace, various disadvantages are liable to occur e.g., (1) temperature of the air to be preheated becomes also variable in a pulsive manner, which eventually brings about unfavorable results in combustion of fuel, (2) the temperature efficiency becomes lowered, and so forth.

SUMMARY OF THE INVENTION

It is therefore the object of the present invention to provide a heat exchanger system which comprises a plurality of regenerative heat exchangers, each provided with a heating means, a plurality of regenerative air preheaters, and tubes connecting each one of the air preheaters with each one of the heat exchangers so that exhaust gas produced in the heating means and discharged from the heat exchanger may be sent into the air preheater to heat the air fed therein and the air thus heated in the preheater may be fed back circulatively to the above-mentioned heating means. In such construction of the heat exchanger system, it become possible that both the combustion air and the fluid to be heated are heated in the heat accumulating medium so as to eliminate the detrimental effect caused by temperature variations and to maintain them at substantially constant temperature, whereby the exhaust gas from the heating means can be effectively utilized, and that the heat-exchanging operation is carried out with good temperature efficiency, whereby thermal efficiency of the apparatus may also become improved.

The foregoing object and other objects of the present invention will become more clearly understandable from the following description of the invention when read in conjunction with the accompanying description of the drawing.

BRIEF EXPLANATION OF THE DRAWING

In the drawing, single FIGURE is a schematic diagram showing one embodiment of the heat exchanger system according to the present invention.

DETAILED DESCRIPTION OF THE PREFERRED EMBODIMENT

Referring to the drawing, the heat exchanger system of the present invention comprises a plurality of regenerative heat exchangers and airpreheaters mutually paired and connected by connecting tubes. More specifically, the regenerative heat exchanger 1 is provided with a burner 1a as a heating source and a regenerative heat accumulating medium 2 contained inside of the heat-exchanger 1 which is further connected to an air preheater 4 at an exhaust gas outlet 3 of the former and an exhaust gas inlet 5 of the latter through a tube 7 provided with a gas flow control valve 6. In this case, the exhaust gas outlet 3 of the heat exchanger 1 also serves as a low temperature side inlet for a fluid to be heated such as air, etc. The air preheater 4 is also provided therein with a regenerative heat accumulating medium (or heat accumulator) 8 as is the case with the heat exchanger. An exhaust gas outlet 9 of the preheater 4 leads to a chimney 10 by way of a tube 11. Similarly, another heat exchanger 12 is connected to another air preheater 15 at an exhaust gas outlet 14 of the former and an exhaust gas inlet 16 of the later through a tube 18 provided with a gas flow control valve 17. In this case, the high-temperature side outlets for the fluid heated in the heat exchangers 1 and 12 are mutually connected by a tube 24 provided thereon with control valves 22 and 23, and an exit junction point 25 for the fluid thus heated is provided between these two control valves.

At a predetermined position on the side of the exhaust gas outlet 20 of the air preheater 15, there is provided a low-temperature side inlet 26 for combustion air. An air compressor 27 is connected to this inlet 26 through a tube 29 having a flow control valve 28. A branch tube 34 provided with a control valve 33 extends from the tube 29 up to the side of the exhaust gas outlet 9 of the air preheater 4 to form a low-temperature side inlet 32 for introducing the combustion air into the preheater 4. Also at a predetermined position on the side of the exhaust gas inlet 16 of the air preheater 15, there is provided a high-temperature side outlet 30 for the heated combustion air, which is connnected with the burner 1a of the heat exchanger 1 by a tube 31. Likewise, at the side of the exhaust gas inlet 5 of the air preheater 4, there is provided a high temperature side outlet 30a for the heated combustion air, which is connected with the burner 12a of the heat exchanger 12 by a tube 35.

Tubes 36 and 37 are respectively provided with control valves 38 and 39 to introduce fluid to be heated into the low-temperature side inlets 3 and 14 of the respective heat exchangers 1 and 12. Tubes 40 and 41 are respectively provided with control valves 42 and 43 operable to supply fuel to the burners 1a and 12a of the respective heat exchangers 1 and 12.

In the above-described construction, the heat exchanger system of the present invention operates in the following manner. It is assumed that the heat accumulating medium 2 in the heat exchanger 1 is being heated by the burner 1a, into which fuel is constantly fed through the tube 41, and that the heat accumulating medium 13 in the heat exchanger 12 is releasing heat having previously been heated by the burner 12a. Under such conditions, the valves 43, 6, 28, 39, and 23 are in the open state and the valves 42, 33, 17, 38, and 22 are in the closed state.

The exhaust gas generated from fuel combustion due to the supply of combustion air into the heat exchanger 1 through the tube 31 enters into the air preheater 4 by way of the tube 7, passes through the heat accumulating medium 8 in the preheater, while heating the same to a predetermined temperature, and is then discharged outside through the chimney 10.

On the other hand, air to be introduced into the air preheater 15 from the air compressor 27 through the tube 29 is heated in the same manner as the heat accumulating medium 8, as aforementioned, and passes through the heat accumulating medium 19 which is in the state of discharging heat, whole it is being heated thereby, and is introduced into the above-mentioned burner 1a through the tube 31. In this case, even if the temperature of the exhaust gas sent from the heat exchanger 12 varies within a wide range as in the conventional heat-exchanging system, constant temperature of the combustion air to be introduced into the burner 1a can be secured, since it is already preheated to a substantially constant temperature by the action of the heat accumulating medium 19 which has offset such temperature variations, accumulated heat therein, and is ready to release heat therefrom. On account of this, the heat exchanger 1 is able to generate super high-temperature exhaust gas.

The fluid to be heated is introduced into the heat exchanger 12 through the tube 37, passes through the heat accumulating medium 13, while it is being heated thereby, and is sent out of the heat exchanger 12 through the tube 24. In this case as the heat accumulating medium 13 has already been heated by the burner 12a to accumulate heat therein and is in the state of releasing heat therefrom, the fluid can be heated to a substantially constant temperature through the heat exchanging action with sufficient temperature efficiency.

After lapse of a certain time period, when the valves 43, 6, 28, 29 and 23 are closed, and the valves 42, 33, 17, 38, and 22 are placed in their open state, the heat accumulating media 2 and 8 become ready to release heat, and the heat accumulating medium 13 begins to be heated by the burner 12a to accumulate heat therein. In this consequence, the heat accumulating medium 19 is heated by the heat of he exhaust gas from the heat exchanger 12 whereby heat is stored up in this medium too. The combustion air introduced into the preheater 4 is preheated by the heat accumulating medium 8 to a substantially constant temperature and then introduced into the burner 12a through the tube 35. Also, the fluid to be heated is introduced into the heat exchanger 1 through the tube 36, is heated by the heat accumulating medium 2 to a substantially constant temperature, and then is sent out of the exit junction point 25 through the tube 24.

Thus, according to the present invention, by causing the combustion air and the fluid to be heated to pass through the heat accumulating medium, it becomes possible that these fluids offset the effect due to temperature variations to maintain the temperature thereof at a substantially constant degree thereby making use of the exhaust gas from the burner. Moreover effective heat exchange can be accomplished with high temperature efficiency, thus enabling the thermal efficiency of the heat exchanger to be improved, and the heat exchanged fluid is continuously taken out.

In the aforedescribed example of the present invention, only two units of the regenerative heat exchangers and the air preheaters are shown to be arranged in the the prescribed combinations for the sake of simplicity. However, more than two units of these apparatuses may be used depending on the necessity. Also, in this example, burners are used as the heating means and any other suitable heating means that is capable of heating the heat accumulating medium and accumulating heat therein may be used. Other changes and modifications may of course be possible within the spirit and scope of the present invention as defined in the claim.

What is claimed is:

1. A heat exchange system comprising a plurality of heat exchangers each containing therein a regenerative heat accumulating medium capable of alternately storing and releasing heat energy; a plurality of air preheaters each containing therein a regenerative heat accumulating medium capable of alternately storing and releasing heat energy; a burner connected to each said heat exchanger receptive of both a fuel and combustion air to burn same and evolve an exhaust gas; means for flowing the exhaust gas from each burner serially through the associated heat exchanger and one of said air preheaters whereby the regenerative heat accumulating mediums contained within that heat exchanger and air preheater absorbs and stores heat energy from the exhaust gas; fluid supply means for supplying fluid to be heated through only those heat exchangers containing therein a heat accumulating medium possessing stored heat energy whereby the heat accumulating medium releases its heat energy to the fluid to heat same; and combustion air supply means for serially supplying combustion air through only those air preheaters containing therein a heat accumulating medium possessing stored heat energy to effect preheating of the combustion air and then to only those burners connected to a heat exchanger containing therein a heat accumulating medium ready to be supplied with heat energy whereby preheated combustion air is supplied to the burners.

2. A heat exchange system according to claim 1; wherein said means for flowing the exhaust gas includes a conduit connecting each heat exchanger with one air preheater, a flow control valve disposed within said conduit operable to control the fluid flow therethrough; and wherein said fluid supply means includes another conduit connected to each said first-mentioned conduit upstream from said flow control valve, and another flow control valve disposed within said another conduit operable to control the fluid flow therethrough; whereby said flow control valves may be alternately operated to control the flow of exhaust gas and the fluid to be heated through each heat exchanger.

3. A heat exchange system according to claim 1; wherein said combustion air supply means includes a conduit connecting each air preheater to a burner connected to a heat exchanger which is different than that which supplies exhaust gas to that air preheater.

4. A heat exchanger system comprising, in combination: a plurality of regenerative heat exchangers each having a low temperature side inlet receptive of a fluid to be heated, a high temperature side outlet for discharging the heat-exchanged fluid, and containing therein a heat accumulating medium capable of storing and releasing heat to heat the fluid, said low temperature side inlet also serving as an outlet for exhaust gas; heating means provided on each of said regenerative heat exchangers to heat the heat accumulating medium contained therein; fuel supply means including supply tubes and flow control valves to supply fuel to each of said heating means through said supply tubes and flow control valves; a plurality of air preheaters each connected to each of said heat exchangers and containing therein a heat accumulating medium capable of absorbing and storing heat from the exhaust gas introduced from each said heat exchanger, each air preheater having an exhaust gas inlet for receiving the exhaust gas from the corresponding heat exchanger, a combustion air inlet for receiving the combustion air, a combustion air outlet for discharging the preheated combustion air and an exhaust gas outlet for discharging the exhaust gas; a tube and a flow control valve connecting each said exhaust gas inlet to the exhaust gas outlet of a corresponding heat exchanger; means including a supply tube and flow control valve for supplying the fluid to be heated to the low temperature side inlet of each heat exchanger and interesting a connecting tube extending between the exhaust gas outlet of the heat exchanger and the exhaust gas inlet of the air preheater; means including additional supply tubes and flow control valves for supplying the combustion air to said combustion air inlet of each of said preheaters; and means including connecting tubes connecting the outlet for the preheated combustion air of the one preheater for one heat exchanger to the heating means for another heat exchanger to supply the combustion air heated in the preheaters by the exhaust gas generated in the heating means and sent from the heat exchangers with the heating means by change over operation of the flow control valves.

* * * * *